(12) United States Patent
Protais

(10) Patent No.: US 11,331,842 B2
(45) Date of Patent: May 17, 2022

(54) METHOD FOR PRODUCING CONTAINERS, BY BOXING THAT CAN BE ADJUSTED DEPENDING ON THE BLOWING CURVE

(71) Applicant: SIDEL PARTICIPATIONS, Octeville-sur-Mer (FR)

(72) Inventor: Pierrick Protais, Octeville-sur-Mer (FR)

(73) Assignee: SIDEL PARTICIPATIONS, Octeville-sur-Mer (FR)

(*) Notice: Subject to any disclaimer, the term of this patent is extended or adjusted under 35 U.S.C. 154(b) by 60 days.

(21) Appl. No.: 17/041,614

(22) PCT Filed: Mar. 6, 2019

(86) PCT No.: PCT/FR2019/050495
§ 371 (c)(1),
(2) Date: Sep. 25, 2020

(87) PCT Pub. No.: WO2019/186007
PCT Pub. Date: Oct. 3, 2019

(65) Prior Publication Data
US 2021/0023762 A1 Jan. 28, 2021

(30) Foreign Application Priority Data
Mar. 28, 2018 (FR) ...................................... 1852668

(51) Int. Cl.
*B29C 49/78* (2006.01)
*B29C 49/48* (2006.01)
(Continued)

(52) U.S. Cl.
CPC ............ *B29C 49/06* (2013.01); *B29C 49/783* (2013.01); *B29C 49/58* (2013.01);
(Continued)

(58) Field of Classification Search
CPC .................. B29C 49/783; B29C 49/78; B29C 2049/4807; B29C 49/4815
See application file for complete search history.

(56) References Cited

U.S. PATENT DOCUMENTS

| | | |
|---|---|---|
| 5,122,327 A | 6/1992 | Spina et al. |
| 2009/0139996 A1 | 6/2009 | Jacson et al. |

(Continued)

OTHER PUBLICATIONS

International search report dated Jun. 5, 2019.

*Primary Examiner* — Robert B Davis

(57) ABSTRACT

A method for producing a container from a blank, inside a forming unit having a mold and a movable insert controlled by a variable-flow solenoid valve, a control unit linked to the solenoid valve. The method comprises developing a boxing curve characterizing the successive positions of the insert; determining, based on a reference blowing curve, points of inflection; measuring, on the boxing curve, distances actually travelled by the insert between points in time, some of which correspond to these points of inflection; and comparing the values of the measured distances with nominal values. If there is a difference between a measured value and a nominal value, controlling, by the control unit, a modification in the flow rate setpoint of the solenoid valve for the next production cycle.

19 Claims, 4 Drawing Sheets

(51) Int. Cl.
*B29C 49/06* (2006.01)
*B29C 49/58* (2006.01)
*B29K 67/00* (2006.01)
*B29L 31/00* (2006.01)

(52) U.S. Cl.
CPC .......................... *B29C 2049/4892* (2013.01); *B29K 2067/003* (2013.01); *B29L 2031/7158* (2013.01)

(56) References Cited

U.S. PATENT DOCUMENTS

| | | |
|---|---|---|
| 2010/0204819 A1 | 8/2010 | Monin et al. |
| 2011/0298162 A1 | 12/2011 | Chomel et al. |
| 2014/0145378 A1 | 5/2014 | Deau et al. |
| 2014/0203481 A1 | 7/2014 | Derrien et al. |
| 2017/0326780 A1* | 11/2017 | Protais ................ B29C 49/4802 |

* cited by examiner

METHOD FOR PRODUCING CONTAINERS, BY BOXING THAT CAN BE ADJUSTED DEPENDING ON THE BLOWING CURVE

The invention relates to the manufacture of containers by forming from blanks made of thermoplastic material (for example of PET).

The forming of a container comprises the introduction of the blank (it can be a preform or an intermediate container having undergone a preforming operation), previously heated to a temperature greater than the glass transition temperature of the material (this temperature is approximately 80° C. in the case of PET), into a mold provided with a wall defining a cavity with the imprint of the container, and the injection into the blank, through an aperture with which it is provided at its neck, of a fluid under pressure such as a gas (generally air) to press the material against the wall of the mold.

In practice, the forming generally comprises two consecutive phases: a preblowing phase during which a fluid is injected into the blank at a preblowing pressure, and a blowing phase during which a fluid is injected into the blank at a blowing pressure greater than the preblowing pressure. In the conventional methods, in which air is employed to perform the forming, the preblowing pressure lies between 5 and 16 bar, and the blowing pressure lies between 20 and 40 bar.

The forming can include a drawing phase, which consists in axially guiding the preform during the preblowing phase by means of a translationally movable rod.

For some applications, it is necessary to form, on the container, hollowed out reserves, notably for esthetic purposes (for example the creation of curved lines), functional purposes (the production of a handle for gripping the container) or structural purposes (for example the production of lateral panels or of a bottom having undergone an additional drawing, intended to absorb the deformation of the container when being filled hot).

When such a reserve reaches a certain depth, the container cannot be formed in an ordinary mold because, despite the high blowing pressure, the latter is insufficient to perfectly press the material against the relief of the mold intended to form the reserve, above all in the zones turned away from the neck of the container from which the blowing bubble is developed.

Also, usually molds are used that are provided with movable inserts that are initially retracted into the wall of the mold and extended during forming to push back the wall of the container, as is illustrated in the European patent application EP 1 922 256 or the corresponding American patent application US 2009/139996 (Sidel).

This technique, commonly called "boxing" is notably used for the forming of containers provided with an integrated handle, or a bottom having undergone an additional drawing and intended to absorb the deformation of the container when filled hot, see the European patent application EP 2 173 637 (Sidel).

The boxing technique is complex because, depending on the form and the depth of the reserves to be produced, the pushback applied by the insert can lead to a thinning of the material, even a local breaking of the wall of the container which makes the latter unusable.

That is why the setting of the machines dedicated to boxing is difficult; it can be entrusted to experienced operators whose skill allows them to produce conformal containers by guesswork.

However, it is normal for the setting parameters (notably the pressure, the blowing flow rate and the rate of the displacement of the insert), initially correct, to undergo, during manufacture, uncontrolled drifts which affect the quality of the containers.

Human perception and responsiveness are neither sufficient to guarantee the detection of the drifts, nor fine and fast enough to proceed with the necessary adjustments.

That is why automation processes have been implemented. Thus, the French patent FR3029133 (Sidel) proposes a solution for linking the boxing to the blowing, notably by shifting the initiation of the boxing phase when a time interval separating an instant marking the real start of displacement of the insert and the instant marking the real start of the blowing phase is decreed sufficiently different from a reference value.

This solution gives partial satisfaction; tests in fact show that the accuracy of the setting could be increased further: such is one objective of the invention, the final aim being to improve the quality of the containers produced.

To this end, a method is proposed for manufacturing a container from a blank made of plastic material, in a forming unit comprising:
  a mold provided with a wall defining a cavity with the impression of the container and an insert that is movable, relative to the wall, between a retracted position, in which the insert is set back relative to the cavity, and an extended position, in which the insert protrudes at least partly into the cavity,
  a boxing system comprising a cylinder, on which the insert is mounted, a fluidic circuit linking the cylinder to a source of fluid under pressure, and a solenoid valve interposed on the fluidic circuit between the cylinder and the source of fluid under pressure;
  a control unit linked to the solenoid valve and programmed to vary the flow rate setpoints thereof in order to drive the displacement of the insert;
this method comprising:
  a preblowing phase, which comprises the injection, into the blank previously introduced into the mold, of a fluid at a preblowing pressure;
  a blowing phase after the preblowing phase, which comprises the injection, into the blank, of a fluid at a blowing pressure greater than the preblowing pressure;
  a boxing phase, which comprises the displacement of the insert from its retracted position to its extended position during at least one of the abovementioned preblowing or blowing phases;
  a phase of real-time measurement of the position of the insert, the values of the position of the insert being memorized;
  a construction phase, based on the values of the position of the insert thus memorized, of a so-called boxing curve characterizing the variations of the position of the insert as a function of time;
this method further comprising the operations consisting in:
  taking into account, on a reference blowing curve characterizing the variations of the pressure prevailing in the blank during preblowing and blowing;
    a first inflection point from which, during preblowing, the pressure is strictly increasing;
    a second inflection point after the first inflection point and from which the slope of the curve exhibits an increase;

detecting, on the boxing curve:
  a boxing start instant marking the start of the displacement of the insert;
  a boxing end instant marking the arrival of the insert at end of travel;
measuring:
  a first distance traveled by the insert in a first time interval lying between the boxing start instant and an instant that is decreed to correspond to the first inflection point of the reference blowing curve;
  a second distance traveled by the insert in a second time interval lying between the instant that is decreed to correspond to the first inflection point and an instant that is decreed to correspond to the second inflection point of the reference blowing curve;
  a third distance traveled by the insert in a third time interval lying between the instant that is decreed to correspond to the second inflection point of the reference blowing curve and the boxing end instant;
comparing the measured distances with predetermined respective nominal distances;
if at least one of the measured distances is decreed to be different from the corresponding nominal distance, commanding, by the control unit, for the next manufacturing cycle in said unit, a modification of the flow rate setpoint of the solenoid valve in each time interval in which a difference has been recorded.

Thus, by modifying if necessary the setpoint of the solenoid valve as a function of the measurements, the distance or distances traveled by the insert in the various intervals converge until they reach the nominal distances.

Various additional features or steps can be provided, alone or in combination.

A measured distance (D) is decreed to be different from the corresponding nominal distance (Dth) as soon as the measured distance is different from the corresponding nominal distance, i.e. D≠Dth.

According to a preferred feature, a measured distance (D) is decreed to be different from the corresponding nominal distance (Dth) if the deviation between the measured distance and the nominal distance is greater than or equal to 5% of the nominal distance value, i.e.:

|Dth−D|≥0.05Dth.

For each container model intended to be manufactured in the forming unit, the reference blowing curve characterizing the variations of the pressure prevailing in the blank as a function of time is worked out in the development of the equipment incorporating this unit.

According to one embodiment:
  the first distance is measured in a first time interval lying between the boxing start instant and a predetermined instant at which the insert is assumed to have traveled the first distance;
  the second distance is measured in a second time interval lying between the instant at which the insert is assumed to have traveled the first distance and a predetermined instant at which the insert is assumed to have traveled the second distance;
  the third distance is measured in a third time interval lying between the instant at which the insert is assumed to have traveled the second distance and the boxing end instant.

As a variant:
  the measurement phase comprises the real-time measurement of the pressure prevailing in the blank during the preblowing and blowing phases;
  the first distance is measured in a first time interval lying between the boxing start instant and an instant at which the pressure in the blank reaches a predetermined value that is decreed to correspond to the first inflection point;
  the second distance is measured in a second time interval lying between the instant at which the insert is assumed to have traveled the first distance and an instant at which the pressure in the blank reaches a second predetermined value that is decreed to correspond to the second inflection point;
  the third distance is measured in a third time interval lying between the instant at which the pressure in the blank reaches the second predetermined value, and the boxing end instant.

According to another embodiment, provision is made for:
  in the measurement phase, the real-time measurement of the pressure prevailing in the blank during the preblowing and blowing phases, the pressure values being memorized;
  in the construction phase, the construction of a so-called blowing curve characterizing the variations of the pressure prevailing in the blank as a function of time;
  the detection of the first inflection point and of the second inflection point on the reference blowing curve.

When a measured distance is decreed to be lower than the corresponding nominal distance, the control unit commands, for the next manufacturing cycle in said unit, an increase in the flow rate setpoint of the solenoid valve in the time interval in which a difference has been recorded.

Conversely, when a distance is decreed to be greater than the corresponding nominal distance, the control unit commands, for the next manufacturing cycle in said unit, a reduction of the flow rate setpoint of the solenoid valve in each time interval in which a difference has been recorded.

Other objects and advantages of the invention will become apparent in light of the description of an embodiment, given hereinbelow with reference to the attached drawings in which.

Figure 1:
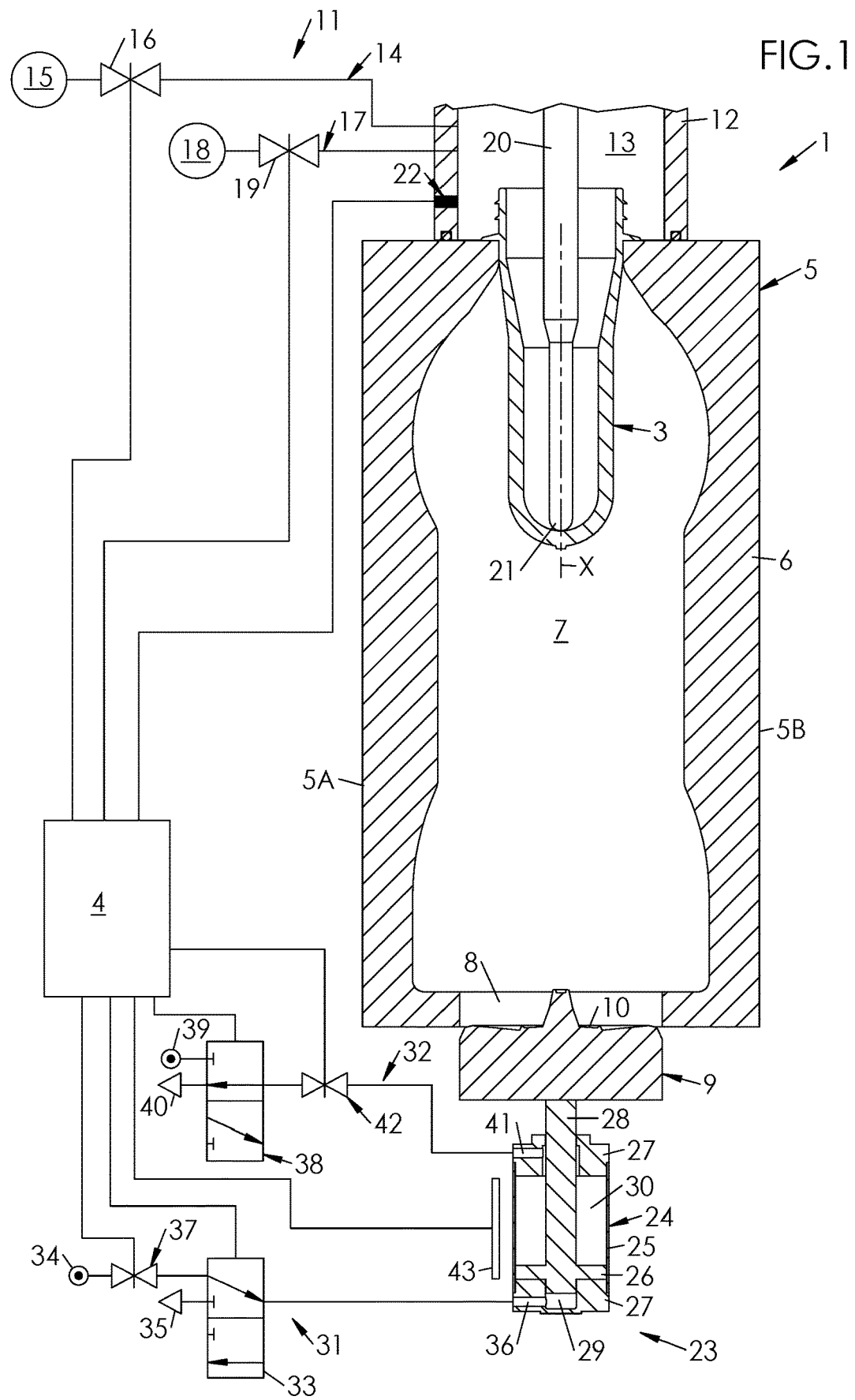
FIG. 1 is a schematic cross-sectional view showing a forming unit equipped with a mold, an injection system and a boxing system, shown at the start of the forming of a container from a blank.
Figure 2:
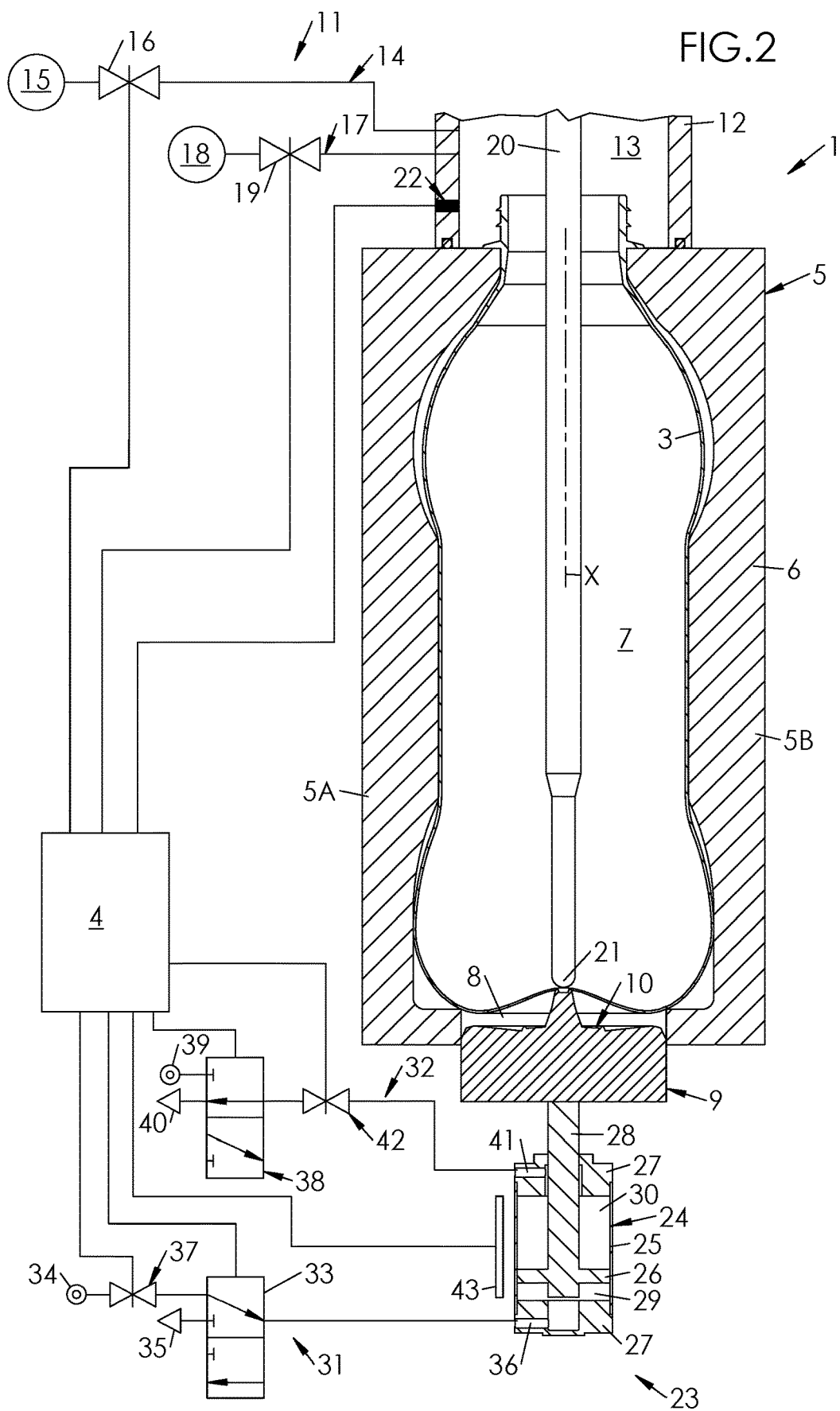
FIG. 2 is a view similar to FIG. 1 showing the end of the preblowing phase.
Figure 3:
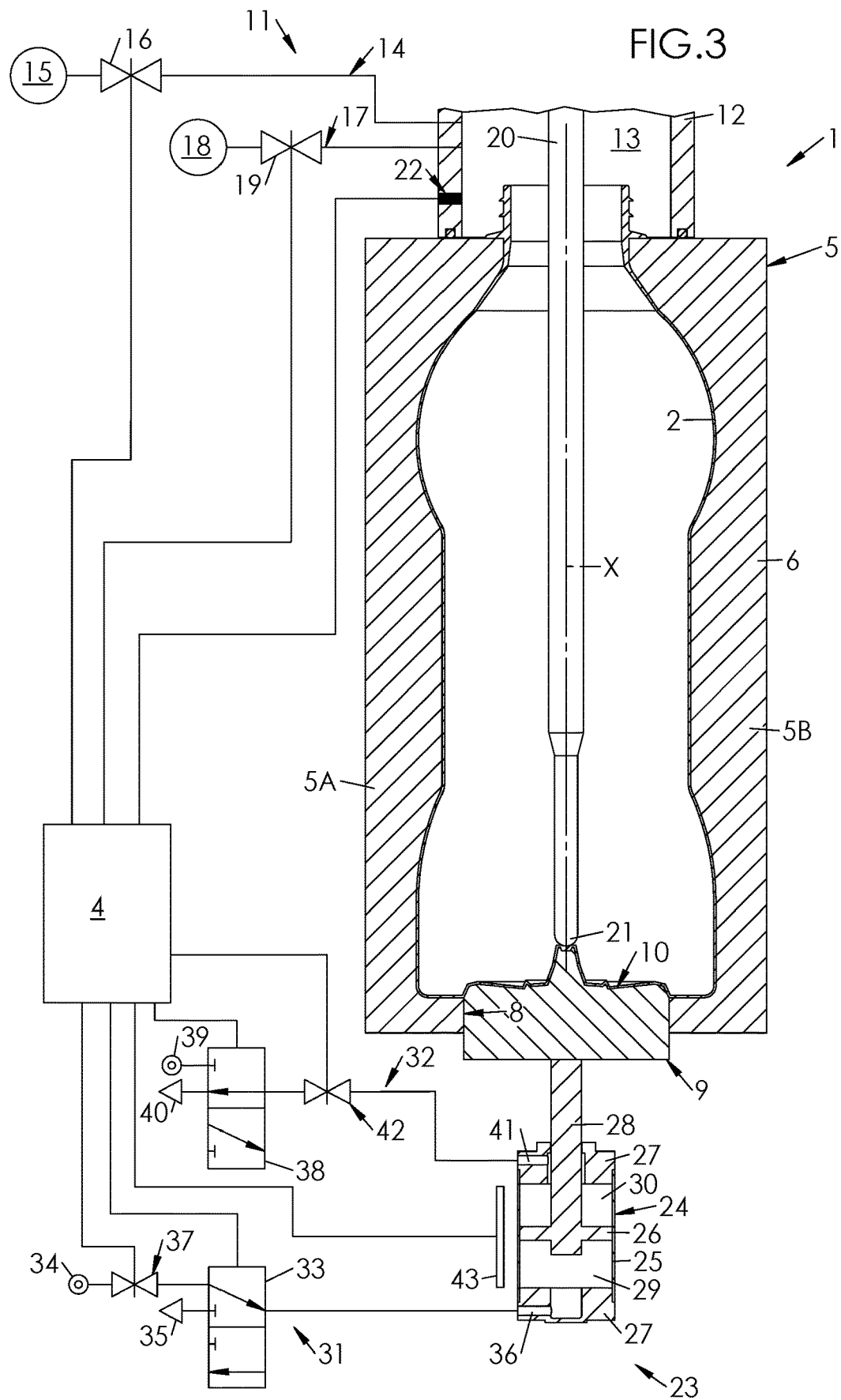
FIG. 3 is a view similar to FIG. 1 and FIG. 2, showing the end of the boxing phase.

FIGS. 1 to 3 show a unit 1 for forming a container 2 by drawing and blowing from a blank 3 made of plastic material, notably of PET (polyethylene terephthalate). The blank 3 can be a raw injection-molding preform (as in the example illustrated) or an intermediate container obtained by one or more prior forming operations performed on a raw preform.

FIG. 2 shows the container during forming. The completed container 2 is visible in FIG. 3. FIGS. 1 to 3 also show the different positions that the boxing system can occupy when a container is being manufactured.

In practice, the forming unit 1 can be mounted, with other similar forming units 1, on a revolving carrousel of a forming machine.

The forming unit 1 is driven automatically for example by a control unit 4 comprising at least one controller (for example of PLC type, PLC being the acronym for programmable logic controller) equipped with actuators.

The forming unit 1 comprises, firstly, a mold 5 provided with a wall 6 defining a cavity 7 with the impression of the container 2 to be formed, which extends along a main axis X and has an aperture 8, and an insert 9 that is mounted to be movable in the aperture 8 relative to the wall 6. The insert 9 is provided with an internal surface 10 with the impression of a reserve to be formed hollowed out on the container 2. According to an embodiment illustrated in the drawings, this reserve is a bottom of the container 2, the additional drawing of which obtained by the movability of the insert 9 in the forming leads to a better structural rigidity by virtue of an increase in the crystallinity of the material. In the example illustrated by the figures, the insert 9 therefore constitutes a mold bottom and the aperture 8 is produced axially in the bottom part of the wall 6. In such a case, the internal surface 10 of the insert 9 has the impression of a reserve to be formed hollowed out on the bottom of the container 2.

In a variant that is not represented, the hollowed-out reserve is for example intended to form a handle or accommodate a handle added on to the container 2. In this case, the insert would be arranged on one side of the wall 6, and the aperture would be produced radially on that side. The mode of operation of such an insert would be the same as that explained hereinbelow in which the insert 9 is a mold bottom.

The insert 9 is mounted to be movable relative to the wall 6 between:
- a retracted position (or bottom position, in the case where it constitutes a mold bottom), illustrated in FIG. 1, in which the insert 9 extends set back relative to the cavity 7 by being away from the aperture 8, and
- an extended position (or top position, in the case where it constitutes a mold bottom), illustrated in FIG. 3, in which the insert 9 at least partly protrudes into the cavity 7.

In practice, in the extended position, the insert 9 (respectively the mold bottom) closes the aperture 8, and the internal surface 10 closes the cavity 7 by thus completing the impression of the container 2. "Travel" of the insert 9 (respectively of the mold bottom) is the term used to denote the distance, denoted $H_E$, separating its retracted position (or bottom position) from its extended position (or top position). The bottom position of the insert 9, in the case where it is a mold bottom, is illustrated in FIG. 1, and its top position is illustrated in FIG. 3. In FIG. 2, the insert is represented in an intermediate position between its bottom position and its top position.

The mold 5 is for example of the wallet type and comprises two half-molds 5A, 5B which are articulated about a common hinge and which open to allow, in succession, evacuation of a formed container 2 and the introduction of a blank 3, after the latter has been previously heated in a thermal conditioning machine placed upstream of the forming machine.

Each forming unit 1 comprises, secondly and as is known per se, an injection device 11 comprising a nozzle 12 defining an injection chamber 13. The nozzle 12 is mounted vertically above the mold 5. The nozzle 12 is axially movable relative to the mold 5 between an uncoupled position, in which it is away from the mold 5 to allow, in succession, the evacuation from the latter of a formed container 2 and the introduction into the latter of a blank 3, and a coupled position (illustrated in FIG. 1, FIG. 2 and FIG. 3), in which it is tightly pressed against the mold 5 around the blank 3, in order to ensure the fluidic connection of the injection chamber 13 with the interior of the blank 3.

The injection device 11 also comprises a preblowing fluidic circuit 14, which links the injection chamber 13 to a source 15 of fluid at a so-called preblowing pressure, via a preblowing solenoid valve 16 driven by the control unit 4. In practice, the fluid is a gas, such as air. The preblowing pressure for example lies between 5 and 16 bar.

The injection device 11 also comprises a blowing fluidic circuit 17, which links the injection chamber 13 to a source 18 of fluid at a so-called blowing pressure, greater than the preblowing pressure, via a blowing solenoid valve 19 driven by the control unit 4. In practice, the fluid is air. The blowing pressure for example lies between 20 and 40 bar. The injection device 11 finally comprises a fluid degassing circuit (not represented) which links the injection chamber 13 to the outside air, via a venting solenoid valve that is also driven by the control unit 4.

Each forming unit 1 comprises, thirdly, a drawing unit equipped with a drawing rod 20 which extends along the axis X of the mold 5 and to a rounded distal end 21 and is mounted to be axially movable relative to the mold 5. The rod 20 extends axially through the nozzle 12, in a tight manner.

The forming unit 1 also comprises a pressure sensor 22 mounted on the nozzle 12 to measure, if appropriate, the pressure prevailing in the injection chamber 13, which is identical to that prevailing in the blank 3 then in the container 2. The sensor 22 is linked to the control unit 4 which memorizes the values thereof at each instant (according to a predetermined period, for example of the order of a few milliseconds).

The forming unit 1 comprises, fourthly, a boxing system 23 for displacing the insert 9 (respectively the mold bottom when the insert 9 constitutes such a mold bottom). According to an embodiment illustrated in FIG. 1, this boxing system 23 comprises a cylinder 24 provided with a cylindrical sleeve 25 and a piston 26 mounted to slide in the sleeve 25 between two end walls 27. The piston 26 is secured to a rod 28 on which the insert 9 is mounted. The fixing of the insert 9 to the rod 28 can be made conventionally, typically by screwing.

The piston 26 and the rod 28 are integrally movable relative to the sleeve 25 between a retracted position, corresponding to the retracted position of the insert 9 (respectively of the mold bottom) (FIG. 1), and an extended position, corresponding to the extended position of the insert 9 (respectively of the mold bottom) (FIG. 3).

In the example illustrated, the cylinder 24 is of double-acting type. The sleeve 25 delimits, on either side of the piston, a primary chamber 29 and a secondary chamber 30.

The boxing system 23 comprises, to control the cylinder 24, at least one primary fluidic circuit 31. The cylinder 24 is advantageously of double-acting type; in this case, the boxing system 23 also comprises a secondary fluidic circuit 32.

According to a preferred embodiment, the primary fluidic circuit 31 comprises a primary distributor 33 of 3/2 type (three orifices, two positions) driven by the control unit 4. The primary distributor 33 has a first inlet by which it is linked to a primary source 34 of fluid under pressure (which can coincide with the source 18 of fluid at the blowing pressure) and a second inlet by which it is linked to a discharge 35.

The primary distributor 33 also has an outlet by which it is linked to the primary chamber 29, via a primary orifice 36 formed in the bottom wall 25.

According to a preferred embodiment illustrated in FIG. 1, FIG. 2 and FIG. 3, the boxing system 23 comprises a primary solenoid valve 37 interposed on the primary fluidic circuit 31 between the cylinder 24 and the primary source 34; the primary solenoid valve 37 is linked to the control unit 4 which ensures the control thereof. In the example illustrated, the primary solenoid valve 37 is interposed between the primary source 34 and the first inlet of the primary distributor 33.

The primary solenoid valve 37 has variable flow rate; its function is to vary the pressure in the primary chamber 29, according to a flow rate setpoint that is imposed (and set) by the control unit 4.

The variation of pressure in the primary chamber 29 induces a variation of the speed of displacement of the piston 26, and therefore of the insert 9 (respectively of the mold bottom) which is secured to it.

In practice, the solenoid valve 37 defines, for the fluid originating from the primary source 34, a passage section that is variable as a function of an electrical setpoint signal applied to the solenoid valve 37 by the control unit 4.

The secondary fluidic circuit 32 preferably comprises a secondary distributor 38 of 3/2 type driven by the control unit 4. The secondary distributor 38 has a first inlet by which it is linked to a secondary source 39 of fluid under pressure (which can coincide with the source 18 of fluid at the blowing pressure and with the primary source 34) and a second inlet by which it is linked to a discharge 40.

The secondary distributor 38 also has an outlet by which it is linked to the secondary chamber 30, via a secondary orifice 41.

According to an embodiment illustrated in FIG. 1, FIG. 2 and FIG. 3, the boxing system 23 also comprises a secondary solenoid valve 42 interposed on the secondary fluidic circuit 32 between the cylinder 24 and the secondary source 39. The secondary solenoid valve 42 is linked to the control unit 4 which ensures the control thereof. In the example illustrated, the secondary solenoid valve 42 is interposed between the cylinder (and more specifically between the secondary orifice 41) and the secondary distributor 38.

The secondary solenoid valve 42 has variable flow rate; its function is to modulate the pressure of the fluid present in the secondary chamber 30, and therefore to help modulate the speed of displacement of the piston 26 and of the insert 9 (respectively of the mold bottom) which is secured to it.

The forming unit 1 comprises, finally, a sensor 43 of the position of the insert 9 (respectively of the mold bottom), linked to the control unit 4. Since the insert 9 (respectively the mold bottom) is secured to the piston 26, the sensor 43 can measure the position thereof. It can be a capacitive sensor, a magnetic sensor, or even an optical sensor.

When the insert 9 is a mold bottom, the drawing rod 20 is kept in contact with the mold bottom (the material of the bottom of the container 2 being sandwiched between them) during the boxing phase, the measurement of the position of the insert 9 constituting the mold bottom can, as a variant, be performed by the measurement of the position of the rod 20, as described in the French patent application FR 2 998 207 or its international equivalent WO 2014/080109.

Manufacturing a container 2 from a blank 3 (notably a preform) during a forming cycle comprises, first of all, a preliminary phase of introduction of the blank 3 into the mold 5, which is performed when the mold is in open position and the insert 9 in bottom position when the latter is a mold bottom. Before its introduction into the mold 5, the blank 3 has first undergone a heating to a temperature higher than the glass transition temperature of the material (approximately 80° C. in the case of PET) so as to exhibit a certain malleability.

Then, the mold 5 is closed and there is then a phase of preblowing of the blank 3, which comprises the injection into the latter of fluid at the preblowing pressure.

To this end, the control unit 4 commands the opening of the preblowing solenoid valve 16 to fluidically connect the source 15 of fluid at the preblowing pressure with the injection chamber 13 (and therefore with the blank 3).

When drawing is provided, the preblowing phase comprises, before the abovementioned injection, the lowering of the rod 20 to the bottom of the blank 3. In this case, the injection of fluid begins immediately when the rod 20 reaches the bottom of the blank 3. The rate of descent of the rod 20 is such that it remains in contact with the bottom of the blank 3 until it reaches the insert 9 constituting the mold bottom.

The preblowing provokes the inflation of the blank 3 until it comes into incomplete contact with the wall 6 and the insert 9 constituting the mold bottom, the preblowing pressure not being sufficient to closely press the blank 3 against the wall 6. In other words, the taking of the impression is not completed at the end of the preblowing phase.

That is why there is provided, following the preblowing phase, a blowing phase, which comprises the injection into the blank 3 of the fluid at the blowing pressure; to this end, the control unit 4 commands the closing of the preblowing solenoid valve 16 and the opening of the blowing solenoid valve 19 to fluidically connect the source 18 of fluid at the blowing pressure with the injection chamber 13 (and therefore with the blank 3). The closing of the preblowing solenoid valve 16 is commanded by the control unit 4 simultaneously with (or with a slight delay on) the command to open the blowing solenoid valve 19.

As illustrated in the drawings, there is also provided a boxing phase which comprises the displacement of the insert 9 constituting the mold bottom from its bottom position to its top position. In the bottom position, the primary orifice 36 of the cylinder 24 is fluidically connected with the discharge 35, and the secondary chamber 30 is fluidically connected with the secondary source 39 of fluid under pressure. To displace the insert 9 constituting the mold bottom to its top position, the control unit 4 drives:

- the primary distributor 33 to fluidically connect the primary orifice 36 of the cylinder 24 with the primary source 34 of fluid;
- the secondary distributor 38 to fluidically connect the secondary orifice 41 with the discharge 40;
- the primary solenoid valve 37 to set the fluid flow rate in the primary fluidic circuit 31 (and therefore the pressure in the primary chamber 29);
- if appropriate, the secondary solenoid valve 42, to set the fluid flow rate in the secondary fluidic circuit 32 (and therefore the counter-pressure in the secondary chamber 30).

The piston 26 is then pushed back to its top position under the pressure of the fluid in the primary chamber 29, against the resisting force of the fluid in the secondary chamber 30.

The control unit 4 commands the primary solenoid valve 37 (and possibly the secondary solenoid valve 42) to, by modulating its flow rate, modulate the speed of displacement of the piston 26 (and therefore of the insert 9 constituting the mold bottom).

To this end, a phase of real-time measurement of the position of the insert 9 is provided. These positions are measured by means of the position sensor 43. The values of the position of the insert 9 are memorized in the control unit 4 (or in a memory that the control unit 4 can access).

A phase is then provided of construction, from the values of the position of the insert 9 thus memorized, of a so-called boxing curve characterizing the variations of the position (denoted H) of the insert 9 as a function of time. This curve is illustrated in the bottom diagram of FIG. 4. By convention, in retracted position of the insert 9, H is zero; in extended position, H is equal to $H_E$.

This boxing curve will make it possible, by feedback taking account of certain preblowing and/or blowing parameters, and by also taking account of boxing parameters measured in real time, to, if necessary, modify the speed of displacement of the insert 9 by acting at least on the flow rate of the primary solenoid valve 37.

Figure 4:
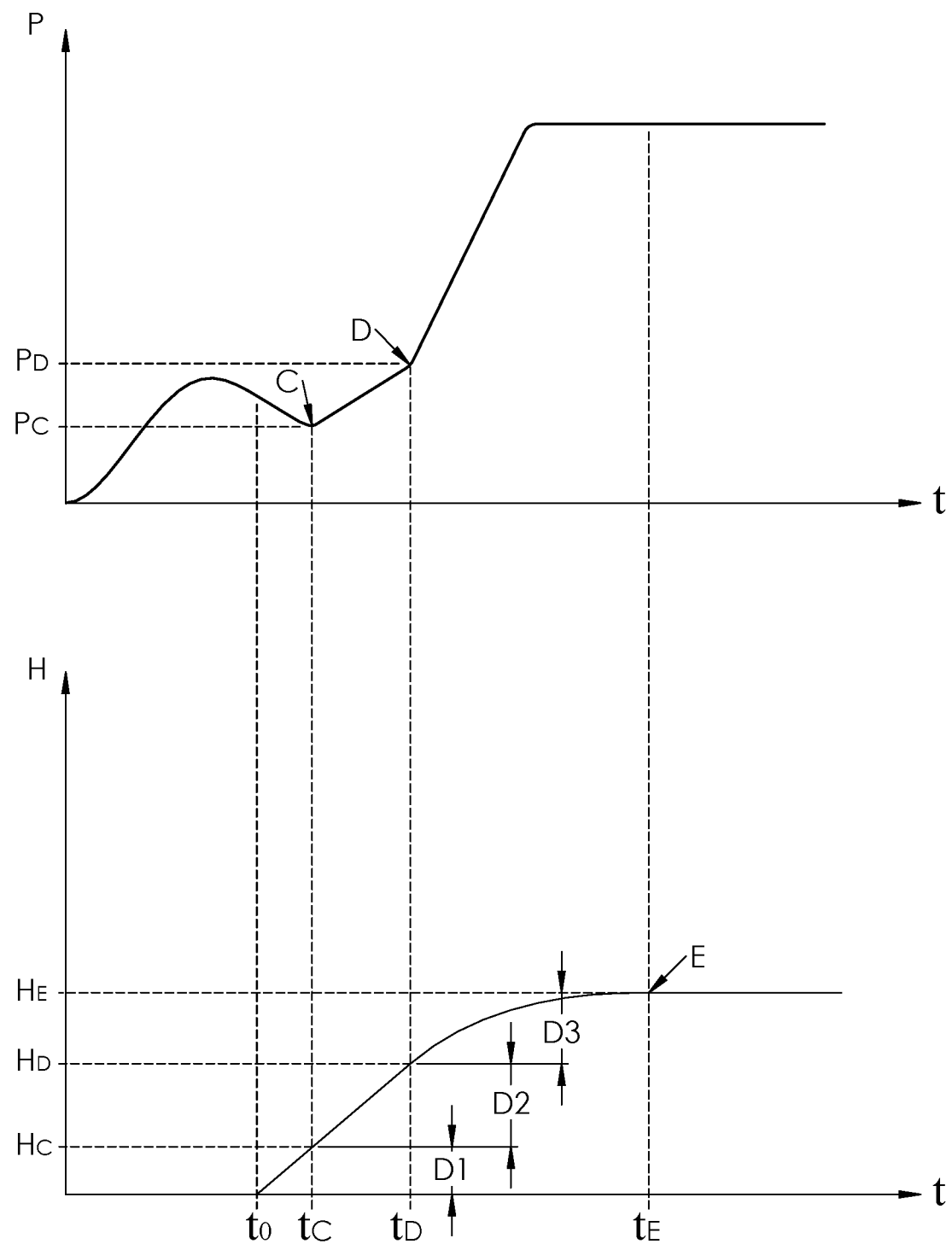
FIG. 4 is a diagram on which are plotted, one above the other, in a temporally synchronized manner:
  at the top, a reference blowing curve illustrating the variations of the pressure measured in the blank over time;
  at the bottom, a boxing curve illustrating the variations of the measured position of the insert over time during a blowing phase.

To this end, a reference blowing curve, illustrated by the top diagram of FIG. 4, characterizing the variations of the pressure prevailing in the blank 3 during the preblowing and blowing, is taken into account.

In one implementation, for each container model 2 intended to be manufactured in the forming unit 1, the reference blowing curve characterizing the variations of the pressure prevailing in the blank 3 as a function of time is worked out in the development of the equipment incorporating this unit 1.

More specifically, on the blowing curve, the following are taken into account:
- a first inflection point C from which, during preblowing, the pressure is strictly increasing;
- a second inflection point D after the point C and from which the slope of the blowing curve exhibits an increase.

The point C characterizes the contact of the material of the blank with the wall 6 of the mold 5. From this point C, the pressure in the blank 3 is strictly increasing (and linearly, as illustrated in the top blowing curve in FIG. 4) because the volume of the blank 3 no longer varies (or does so only negligibly) while fluid continues to be injected therein. The instant that is decreed to correspond to the point C on the blowing curve is denoted $t_C$.

The point D characterizes the increase in pressure following the initiation of the blowing phase, with substantially constant volume, and before the pressure in the container 2 is balanced with the pressure prevailing in the source 18 (that is to say that the pressure in the container 2 reaches the blowing pressure). The instant that is decreed to correspond to the point D on the blowing curve is denoted $t_D$.

As can be seen in FIG. 4, the boxing phase is initiated during the preblowing phase.

$t_0$ is used to denote the instant, called boxing start instant, from which the insert 9 leaves its retracted position and begins to be displaced toward its extended position (in other words, from which H is non-zero).

E is used to denote the point, on the boxing curve, where $H=H_E$, that is to say where the insert 9 reaches its extended position. $t_E$ is used to denote the corresponding instant (boxing end instant).

Moreover, $H_C$ is used to denote the position of the insert 9 at the instant $t_C$ and $H_D$ is used to denote the position of the insert 9 at the instant $t_D$.

The position, and the speed, of the insert 9 during the boxing phase, vary continually. However, in the boxing phase, three steps are distinguished:
- an initial step, between the instant $t_0$ and the instant $t_C$, during which the insert 9 travels an initial distance denoted D1 (D1=$H_C$);
- an intermediate step, between the instant $t_C$ and the instant $t_D$, during which the insert 9 travels an intermediate distance denoted D2 (D2=$H_D$−$H_C$);
- a final step, between the instant $t_D$ and the instant $t_E$, during which the insert 9 travels a final distance denoted D3 (D3=$H_E$−$H_D$).

The position sensor 43 makes it possible to detect (in practice, it is the control unit 4 which is responsible for this detection), on the boxing curve:
- the instant $t_0$;
- the instant $t_E$.

Then, the distances D1, D2 and D3 actually traveled by the insert 9 are measured (by the control unit 4).

These distances are compared (by the control unit 4) with predetermined respective nominal distances D1*th*, D2*th*, D3*th*.

If at least one of the measured distances D1, D2 or D3 is decreed (by the control unit 4) to be different from the corresponding nominal distance D1*th*, D2*th*, D3*th*, it is a sign that the displacement of the insert 9 does not correspond to the desired displacement. It is however assumed that the boxing start instant $t_0$ is correct.

In one implementation, a measured distance D1, D2, D3 is decreed to be different from the corresponding nominal distance D1*th*, D2*th*, D3*th* as soon as the measured distance differs from the nominal distance, i.e.:

$$D1th \neq D1 \text{ and/or}$$

$$D2th \neq D2 \text{ and/or}$$

$$D3th \neq D3.$$

However, preferably, a tolerance is acceptable and a measured distance D1, D2, D3 is decreed to be different from the corresponding nominal distance D1*th*, D2*th*, D3*th* if the deviation between these two distances is greater than or equal to 5% of the nominal distance value, i.e.:

$$|D1th - D1| \geq 0.05 D1th \text{ and/or}$$

$$|D2th - D2| \geq 0.05 D2th \text{ and/or}$$

$$|D3th - D3| \geq 0.05 D3th.$$

In other words, a measured distance D1, D2, D3 is decreed to be equivalent to the corresponding nominal distance D1*th*, D2*th*, D3*th* if the deviation between these two distances is less than or equal to 5%, i.e.:

$$0.95 D1th \leq D1 \leq 1.05 D1th \text{ and/or}$$

$$0.95 D2th \leq D2 \leq 1.05 D2th \text{ and/or}$$

$$0.95 D3th \leq D3 \leq 1.05 D3th.$$

If D1<D1*th*, the speed of the insert 9 during the initial step is less than the desired speed, and it should be increased. To this end, the flow rate setpoint of the primary solenoid valve 37 is revised upward by the control unit 4 for the initial step of the next cycle; in that way, with a greater speed, the distance traveled during a given time interval increases.

If, on the other hand, D1>D1*th*, the speed of the insert 9 during the initial step is greater than the desired speed, and it should be reduced. To this end, the flow rate set point of the primary solenoid valve 37 is revised downward by the control unit 4 for the initial step of the next cycle; in that way, with a lower speed, the distance traveled during a given time interval decreases.

If D1≅D1*th*, and if D2<D2*th*, the speed of the insert 9 during the intermediate step is less than the desired speed, and it should be increased. To this end, the flow rate setpoint of the primary solenoid valve 37 is revised upward by the control unit 4 for the intermediate step of the next manufacturing cycle.

If, on the other hand, D2>D2*th*, the speed of the insert 9 during the intermediate step is greater than the desired speed, and it should be reduced. To this end, the flow rate setpoint of the primary solenoid valve 37 is revised downward by the control unit 4 for the intermediate step of the next manufacturing cycle.

As for the distance D3, it depends on D1 and D2: D3=$H_E$–D1–D2. So that if D1≅D1*th* and if D2≅D2*th*, then D3≅D3*th* since $H_E$ is fixed. It is indeed possible to command a modification of the flow rate of the primary solenoid valve 37 only under the assumption that that distance D3 would be decreed to be different from the corresponding nominal distance D3*th*; however, in this case, the flow rate of the solenoid valve 37 must be modified from the intermediate step of the next manufacturing cycle.

In fact, if D3<D3*th*, that means that the speed of displacement of the insert 9 during the initial step and/or during the intermediate step is greater than the desired speed, and that it should be reduced the initial step and/or the intermediate step of the next cycle. To that end, the flow rate setpoint of the primary solenoid valve 37 is revised downward by the control unit 4 for the initial step and/or the intermediate step of the next manufacturing cycle.

On the other hand, if D3>D3*th*, that means that the speed of displacement of the insert 9 during the initial step and/or during the intermediate step is less than the desired speed, and that it should be increased for the initial step and/or the intermediate step of the next manufacturing cycle.

These modifications make it possible to make corrections to the speed of displacement of the insert 9 in the next manufacturing cycles. It is possible that, when a drift is observed by the detection of a difference between at least one of the measured distances D1, D2, D3 and the respective nominal distance D1*th*, D2*th*, D3*th*, several successive manufacturing cycles may be necessary to realign the measured distance or distances D1, D2 or D3 that have diverged with the respective nominal distance D1*th*, D2*th* or D3*th*.

According to a first embodiment, it is assumed that, for a given container 2, the preblowing phase is conformal, that is to say that it does not exhibit any notable shift (temporal and/or pressure-wise) relative to a predetermined preblowing model, and it is assumed also that the blowing phase is conformal, that is to say that it does not exhibit any notable shift (temporal or pressure-wise) relative to a predetermined blowing model.

In this case, the blowing curve that is taken into account can be the abovementioned reference curve, worked out in the development of the equipment intended to manufacture the container 2 concerned; the points C and D are theoretical points of this curve, defined as indicated previously; their respective instants of occurrence, $t_C$ and $t_D$, are predetermined and identical for each manufacturing cycle. The same applies for their corresponding theoretical respective pressures, denoted PC and PD.

In theory, at the instant $t_C$, the insert 9 is assumed to have traveled the first distance D1; at the instant $t_D$, it is assumed to have additionally traveled the second distance D2; at the instant $t_E$, it is assumed to have additionally traveled the third distance D3.

In this case, it is possible to drive the primary solenoid valve 37 temporally, that is to say solely on the basis of the measurements of:
- the distance D1 traveled between the instants $t_0$ and $t_C$ (at which the insert 9 is, theoretically, assumed to have traveled the first distance D1);
- the distance D2 traveled between the instants $t_C$ and $t_D$ (at which the insert 9 is, theoretically, assumed to have traveled the second distance D2);
- the distance D3 traveled between the instants $t_D$ and $t_E$ (at which the insert 9 is, theoretically, assumed to have traveled the third distance D3).

In this case, to and to are instants previously memorized without it being necessary to deduce them from a real blowing curve based on a detection of the points C and D.

As a variant, it is possible to drive the primary solenoid valve 37 by pressure, that is to say on the basis of the theoretical pressures PC and PD, memorized in the control unit 4, by measuring:
- the distance D1 traveled between the instants $t_0$ and the instant at which the pressure measured in the blank 3 reaches the value PC as memorized;
- the distance D2 traveled between the instant at which the pressure measured in the blank 3 reaches the value PC as memorized and the instant at which the pressure measured in the blank 3 reaches the value PD as memorized;
- the distance D3 traveled between the instant at which the pressure measured in the blank 3 reaches the value PD as memorized and the instant $t_E$.

However, it is possible to envisage aligning the measurements on the real points C and D, detected on a blowing curve worked out from pressure measurements performed in real time in the blank 3.

In this case, and according to a second embodiment, the measurement phase comprises the real-time measurement of the pressure prevailing in the blank 3 during the preblowing and blowing phases.

The construction phase then comprises the construction of a blowing curve (FIG. 4) characterizing the variations—real variations—of the pressure prevailing in the blank 3 as a function of time, said real pressure curve becoming the reference blowing curve.

In this case, the points C and D are effectively detected on the duly constructed reference blowing curve.

The result of this method is an improvement in the accuracy of setting of the instantaneous position (or speed) of the insert 9 during the boxing, benefiting the quality of the containers 2 produced.

Indeed, the points C and D are singular points of the blowing curve which characterize respective instants $t_C$ and $t_D$ that are important in the forming. More specifically, they mark phases of increasing, first of all slowly (point C) then fast (point D), of the pressure in the blank 3, and therefore of the resisting forces which are exerted on the insert 9 and oppose its displacement.

It therefore seemed important to check that, at these instants $t_C$ and $t_D$ (whether they are predetermined from a theoretical reference blowing curve or from a reference blowing curve constructed in real time), the position (or speed) of the insert 9 is correct and, if it is not, to correct it to realign it on a correct value.

The invention claimed is:

1. A method for manufacturing a container (2) from a blank (3) made of plastic material, in a forming unit (1) comprising:
- a mold (5) provided with a wall (6) defining a cavity (7) with the impression of the container (2) and an insert (9) that is movable, relative to the wall (6), between a retracted position, in which the insert (9) is set back relative to the cavity (7), and an extended position, in which the insert (9) at least partly protrudes into the cavity (7),
- a boxing system (23) comprising a cylinder (24), on which the insert (9) is mounted, a fluidic circuit (31) linking the cylinder (24) to a source (34) of fluid under pressure, and a solenoid valve (37) interposed on the fluidic circuit (31) between the cylinder (24) and the source (34) of fluid under pressure;
- a control unit (4) linked to the solenoid valve (37) and programmed to vary flow rate setpoints thereof in order to drive the displacement of the insert;

this method comprising:
- injecting, during a preblowing phase, the blank (3) previously introduced into the mold (5), of a fluid at a preblowing pressure;
- injecting, during a blowing phase that occurs after the preblowing phase, into the blank (3) of a fluid at a blowing pressure greater than the preblowing pressure;
- displacing, during a boxing phase, the insert (9) from its retracted position to its extended position during at least one of the abovementioned preblowing or blowing phases;
- measuring, during a phase of real-time measurement, the position of the insert (9), the values of the position of the insert (9) being memorized;
- developing, during a construction phase based on the values of the position of the insert (9) memorized, a boxing curve characterizing the variations of the position of the insert (9) as a function of time;
- determining, based on a reference blowing curve characterizing the variations of the pressure prevailing in the blank (3) during preblowing and blowing:
  - a first inflection point (C), from which, during preblowing, the pressure is strictly increasing;
  - a second inflection point (D) after the point (C) and from which the slope of the curve shows an increase;
- detecting, on the boxing curve:
  - a boxing start instant (t0) marking the start of the displacement of the insert (9);
  - a boxing end instant (tE) marking the arrival of the insert (9) at the end of travel;
- measuring:
  - a first distance (D1) traveled by the insert (9) in a first time interval lying between the boxing start instant (t0) and an instant (tC) that is decreed to correspond to the first inflection point (C) of the reference blowing curve;
  - a second distance (D2) traveled by the insert (9) in a second time interval lying between the instant (tC) that is decreed to correspond to the first inflection point (C) and an instant (tD) that is decreed to correspond to the second inflection point (D) of the reference blowing curve;
  - a third distance (D3) traveled by the insert (9) in a third time interval lying between the instant (tD) that is decreed to correspond to the second inflection point (D) of the reference blowing curve and the boxing end instant (tE);
- comparing the measured distances (D1; D2; D3) with predetermined respective nominal distances (D1$th$; D2$th$; D3$th$);
- if at least one of the measured distances (D1; D2; D3) is decreed to be different from the corresponding nominal distance (D1$th$; D2$th$; D3$th$), commanding, by the control unit (4), for the next manufacturing cycle in said unit, a modification of the flow rate setpoint of the solenoid valve (37) in each time interval in which a difference has been recorded.

2. The method as claimed in claim 1, wherein a measured distance (D1; D2; D3) is decreed to be different from the corresponding nominal distance (D1$th$; D2$th$; D3$th$) as soon as the measured distance differs from the nominal distance, i.e.:

$D1th \neq D1$ and/or $D2th \neq D2$ and/or $D3th \neq D3$.

3. The method as claimed in claim 1, wherein a measured distance (D1; D2; D3) is decreed to be different from the corresponding nominal distance (D1$th$; D2$th$; D3$th$) if the deviation between the measured distance and the nominal distance is greater than or equal to 5% of the nominal distance value, i.e.:

$|D1th - D1| \geq 0.05 D1th$ and/or $|D2th - D2| \geq 0.05 D2th$ and/or $|D3th - D3| \geq 0.05 D3th$.

4. The method as claimed in claim 1, wherein, for each container model (2) intended to be manufactured in the forming unit (1), the reference blowing curve characterizing the variations of the pressure prevailing in the blank (3) as a function of time is worked out in the development of the equipment incorporating this unit (1).

5. The method as claimed in claim 1, wherein:
- the first distance (D1) is measured in a first time interval lying between the boxing start instant (t0) and a predetermined instant (tC) at which the insert (9) is assumed to have traveled the first distance (D1);
- the second distance (D2) is measured in a second time interval lying between the instant (tC) at which the insert (9) is assumed to have traveled the first distance (D1) and a predetermined instant (tD) at which the insert (9) is assumed to have traveled the second distance (D2);
- the third distance (D3) is measured in a third time interval lying between the instant (tD) at which the insert (9) is assumed to have traveled the second distance (D2) and the boxing end instant (tE).

6. The method as claimed in claim 1, wherein:
- the measurement phase comprises the real-time measurement of the pressure prevailing in the blank (3) during the preblowing and blowing phases,
- the first distance (D1) is measured in a first time interval lying between the boxing start instant (t0) and an instant at which the pressure in the blank reaches a predetermined value (PC) that is decreed to correspond to the first inflection point (C);
- the second distance (D2) is measured in a second time interval lying between the instant at which the pressure in the blank reaches a predetermined value (PC) that is decreed to correspond to the first inflection point (C) and an instant at which the pressure in the blank (3)

reaches a second predetermined value (PD) that is decreed to correspond to the second inflection point (D);

the third distance (D3) is measured in a third time interval lying between the instant at which the pressure in the blank (3) has reached the second predetermined value (PD), and the boxing end instant (tE).

7. The method as claimed in claim 1, wherein:

in the measurement phase, the real-time measurement of the pressure prevailing in the blank (3) during the preblowing and blowing phases, the pressure values being memorized;

in the construction phase, the construction of a so-called blowing curve characterizing the variations of the pressure prevailing in the blank (3) as a function of time;

the detection of the first inflection point (C) and of the second inflection point (D) on the reference blowing curve.

8. The method as claimed in claim 1, wherein, when a measured distance (D1; D2; D3) is decreed to be less than the corresponding nominal distance (D1th; D2th; D3th), the control unit (4) commands, for the next manufacturing cycle in said unit, an increase in the flow rate setpoint of the solenoid valve (37) in each time interval in which a difference has been recorded.

9. The method as claimed in claim 1, wherein, when a measured distance (D1; D2; D3) is decreed to be greater than the corresponding nominal distance (D1th; D2th; D3th), the control unit (4) commands, for the next manufacturing cycle in said unit, a reduction of the flow rate setpoint of the solenoid valve (37) in each time interval in which a difference has been recorded.

10. The method as claimed in claim 2, wherein, for each container model (2) intended to be manufactured in the forming unit (1), the reference blowing curve characterizing the variations of the pressure prevailing in the blank (3) as a function of time is worked out in the development of the equipment incorporating this unit (1).

11. The method as claimed in claim 3, wherein, for each container model (2) intended to be manufactured in the forming unit (1), the reference blowing curve characterizing the variations of the pressure prevailing in the blank (3) as a function of time is worked out in the development of the equipment incorporating this unit (1).

12. The method as claimed in claim 2, wherein:

the first distance (D1) is measured in a first time interval lying between the boxing start instant (to) and a predetermined instant (tC) at which the insert (9) is assumed to have traveled the first distance (D1);

the second distance (D2) is measured in a second time interval lying between the instant (tC) at which the insert (9) is assumed to have traveled the first distance (D1) and a predetermined instant (tD) at which the insert (9) is assumed to have traveled the second distance (D2);

the third distance (D3) is measured in a third time interval lying between the instant (tD) at which the insert (9) is assumed to have traveled the second distance (D2) and the boxing end instant (tE).

13. The method as claimed in claim 3, wherein:

the first distance (D1) is measured in a first time interval lying between the boxing start instant (t0) and a predetermined instant (tC) at which the insert (9) is assumed to have traveled the first distance (D1);

the second distance (02) is measured in a second time interval lying between the instant (tC) at which the insert (9) is assumed to have traveled the first distance (D1) and a predetermined instant (tD) at which the insert (9) is assumed to have traveled the second distance (D2);

the third distance (D3) is measured in a third time interval lying between the instant (tD) at which the insert (9) is assumed to have traveled the second distance (D2) and the boxing end instant (tE).

14. The method as claimed in claim 2, wherein:

the measurement phase comprises the real-time measurement of the pressure prevailing in the blank (3) during the preblowing and blowing phases, the first distance (D1) is measured in a first time interval lying between the boxing start instant (t0) and an instant at which the pressure in the blank reaches a predetermined value (PC) that is decreed to correspond to the first inflection point (C);

the second distance (D2) is measured in a second time interval lying between the instant at which the pressure in the blank reaches a predetermined value (PC) that is decreed to correspond to the first inflection point (C) and an instant at which the pressure in the blank (3) reaches a second predetermined value (PD) that is decreed to correspond to the second inflection point (D);

the third distance (D3) is measured in a third time interval lying between the instant at which the pressure in the blank (3) has reached the second predetermined value (PD), and the boxing end instant (tE).

15. The method as claimed in claim 3, wherein:

the measurement phase comprises the real-time measurement of the pressure prevailing in the blank (3) during the preblowing and blowing phases, the first distance (D1) is measured in a first time interval lying between the boxing start instant (t0) and an instant at which the pressure in the blank reaches a predetermined value (PC) that is decreed to correspond to the first inflection point (C);

the second distance (D2) is measured in a second time interval lying between the instant at which the pressure in the blank reaches a predetermined value (PC) that is decreed to correspond to the first inflection point (C) and an instant at which the pressure in the blank (3) reaches a second predetermined value (PD) that is decreed to correspond to the second inflection point (D);

the third distance (D3) is measured in a third time interval lying between the instant at which the pressure in the blank (3) has reached the second predetermined value (PD), and the boxing end instant (tE).

16. The method as claimed in claim 2, wherein:

in the measurement phase, the real-time measurement of the pressure prevailing in the blank (3) during the preblowing and blowing phases, the pressure values being memorized;

in the construction phase, the construction of a so-called blowing curve characterizing the variations of the pressure prevailing in the blank (3) as a function of time;

the detection of the first inflection point (C) and of the second inflection point (D) on the reference blowing curve.

17. The method as claimed in claim 3, wherein:

in the measurement phase, the real-time measurement of the pressure prevailing in the blank (3) during the preblowing and blowing phases, the pressure values being memorized;

in the construction phase, the construction of a so-called blowing curve characterizing the variations of the pressure prevailing in the blank (3) as a function of time;

the detection of the first inflection point (C) and of the second inflection point (D) on the reference blowing curve.

18. The method as claimed in claim 2, wherein, when a measured distance (D1; D2; D3) is decreed to be less than the corresponding nominal distance (D1th; D2th; D3th), the control unit (4) commands, for the next manufacturing cycle in said unit, an increase in the flow rate setpoint of the solenoid valve (37) in each time interval in which a difference has been recorded.

19. The method as claimed in claim 3, wherein, when a measured distance (D1; D2; D3) is decreed to be greater than the corresponding nominal distance (D1th; D2th; D3th), the control unit (4) commands, for the next manufacturing cycle in said unit, a reduction of the flow rate setpoint of the solenoid valve (37) in each time interval in which a difference has been recorded.

* * * * *